United States Patent
Oomori et al.

(10) Patent No.: US 6,325,051 B1
(45) Date of Patent: Dec. 4, 2001

(54) HIGH-PRESSURE FUEL SUPPLYING APPARATUS AND METHOD FOR INTERNAL COMBUSTION ENGINE

(75) Inventors: Yuzuru Oomori, Toyota; Masanobu Ohmi, Kasugai, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/413,526

(22) Filed: Oct. 6, 1999

(30) Foreign Application Priority Data

Oct. 21, 1998 (JP) .................................................. 10-300124

(51) Int. Cl.$^7$ .................................................. F02M 37/04
(52) U.S. Cl. ........................... 123/516; 123/447; 417/499
(58) Field of Search .................................... 123/516, 456, 123/446, 506, 447; 417/499, 437

(56) References Cited

U.S. PATENT DOCUMENTS

| | | | |
|---|---|---|---|
| 2,297,238 | * 9/1942 | Neugebauer et al. | 123/516 |
| 2,878,889 | * 3/1959 | Gilbert | 123/516 |
| 4,079,717 | * 3/1978 | Shirose | 123/516 |
| 4,625,694 | * 12/1986 | Adey et al. | 123/450 |
| 4,831,991 | * 5/1989 | Cayot | 123/516 |
| 4,842,497 | * 6/1989 | Hafele et al. | 417/499 |
| 5,701,873 | * 12/1997 | Schneider | 123/516 |
| 5,957,673 | * 9/1999 | Kampichler et al. | 417/437 |

FOREIGN PATENT DOCUMENTS

| | | | |
|---|---|---|---|
| 317317 | * 1/1930 | (GB) | 123/516 |
| A-8-319913 | 12/1996 | (JP) . | |
| A-8-334076 | 12/1996 | (JP) . | |
| A-9-25860 | 1/1997 | (JP) . | |

* cited by examiner

Primary Examiner—Carl S. Miller
(74) Attorney, Agent, or Firm—Oliff & Berridge PLC

(57) ABSTRACT

In a high-pressure fuel supplying apparatus, fuel is pumped from a fuel tank by a feed pump into a fuel gallery of a high-pressure pump via a low-pressure fuel passage. The low-pressure fuel passage can include a reservoir chamber that is formed by vertically upwardly expanding a portion of the passage located near the fuel gallery. The reservoir chamber is located above an upper end of the fuel gallery in a vertical direction. A communication passage, forming a portion of the low-pressure fuel passage, can be connected at one end thereof to an upper end portion of the fuel gallery. Another end portion of the communication passage extends diagonally upward from the upper end portion of the fuel gallery, and connects to the reservoir chamber. According to other embodiments, the reservoir chamber can be omitted as long as a portion of the communication passage is provided vertically above an upper end of the fuel gallery. Alternatively, the communication passage can lead to (and convey the fuel vapor produced in the fuel gallery to) an auxiliary injector or to a dedicated reservoir chamber that is separate from the low-pressure fuel passage.

14 Claims, 9 Drawing Sheets

HIGH-PRESSURE FUEL SUPPLYING APPARATUS AND METHOD FOR INTERNAL COMBUSTION ENGINE

INCORPORATION BY REFERENCE

The disclosure of Japanese Patent Application No. HEI 10-300124 filed on Oct. 21, 1998 including the specification, drawings and abstract, is incorporated herein by reference in its entirety.

BACKGROUND OF THE INVENTION

1. Field of the Invention

The present invention relates to a return-less type high-pressure fuel supplying apparatus and method for an internal combustion engine that has a high-pressure pump for supplying high-pressure fuel to the internal combustion engine but does not have a return passage for returning surplus fuel from the high-pressure pump to a fuel tank.

2. Description of Related Art

In a fuel supplying apparatus applied to a generally termed in-cylinder fuel injection type internal combustion engine in which fuel is directly injected into the cylinders of the internal combustion engine, fuel is first pumped from a fuel tank into a fuel gallery via a feed pump, and then introduced into a pressurizing chamber of a high-pressure pump during descent of a plunger of the high-pressure pump. Fuel introduced into the pressurizing chamber is pressurized by the plunger to a pressure that is suitable for in-cylinder injection. Fuel pressurized in this manner then is supplied to a delivery pipe to which fuel injection valves are connected.

In this type of fuel supplying apparatus, after a certain amount of fuel is supplied to the high-pressure pump, a surplus amount thereof, which does not need to be pumped toward the engine, is normally returned to the fuel tank through a return passage. In a typical construction, however, the high-pressure pump is disposed near the internal combustion engine, so that fuel introduced into the high-pressure pump is likely to undergo a temperature increase due to heat from the engine. Therefore, when surplus fuel returns to the fuel tank through the return passage, the fuel temperature in the fuel tank rises, so that the amount of fuel vapor occurring in the fuel tank increases.

As a countermeasure, a return-less type high-pressure fuel supplying apparatus has been proposed (for example, in Japanese Laid-Open Patent Application No. HEI 9-25860) in which the need for a return passage is eliminated by controlling the amount of fuel pumped from the feed pump into the high-pressure pump to a minimum amount that is actually needed. Therefore, this return-less apparatus prevents an undesired event in which heated fuel returns to the fuel tank. Hence, the apparatus is able to prevent or curb fuel temperature increases in the fuel tank and reduce the occurrence of fuel vapor in the fuel tank.

However, since fuel circulation between the high-pressure pump and the fuel tank is eliminated, the return-less type fuel supplying apparatus tends to have relatively high fuel temperatures in the fuel gallery and in the pressurizing chamber. Therefore, if the engine is stopped immediately after the engine temperature has increased due to, for example, a high-load operation or the like, heat from the engine may increase the fuel temperature in the fuel gallery or in the pressurizing chamber approximately to the boiling point of the fuel, so that a portion of the fuel may vaporize and add fuel vapor.

Furthermore, if the engine is restarted at an increased fuel temperature, there is a further increased likelihood of a phenomenon (cavitation) in which when fuel is moved from the fuel gallery into the pressurizing chamber by reciprocations of the plunger, the fuel pressure temporarily drops so that vapor occurs.

The produced vapor is continually moved back and forth between the fuel gallery and the pressurizing chamber by reciprocations of the plunger. If fuel pressurization is performed in the pressurizing chamber when a large amount of vapor has moved into the chamber, the plunger merely compresses fuel vapor, and it becomes difficult for the plunger to sufficiently pressurize liquid fuel. In this manner, the conventional return-less type high-pressure fuel supplying apparatus may fail to secure a predetermined fuel injection pressure when the engine temperature is high. Therefore, the conventional return-less apparatus may cause deterioration of the restarting performance, resulting in, for example, a prolonged time required for a start, occurrence of an engine stall immediately following a start, or the like.

SUMMARY OF THE INVENTION

Accordingly, it is an object of the present invention to provide a high-pressure fuel supplying apparatus and method for an internal combustion engine that secures good restarting performance when the engine temperature is high.

In accordance with one aspect of the invention, a high-pressure fuel supplying apparatus for an internal combustion engine includes a high-pressure pump having a fuel gallery and a pressurizing chamber. The high-pressure pump introduces fuel from the fuel gallery into the pressurizing chamber, pressurizes fuel to a high pressure in the pressurizing chamber, and supplies pressurized fuel to an in-cylinder fuel injection valve. The high-pressure fuel supplying apparatus further has a feed pump that pumps fuel from a fuel tank to the fuel gallery. A vapor discharging passage is provided for discharging vapor from the fuel gallery. The vapor discharging passage is located above or at substantially the same vertical level as an upper end of the fuel gallery in a vertical direction.

In this high-pressure fuel supplying apparatus, vapor dwelling in the fuel gallery is discharged into the vapor discharging passage. Therefore, the apparatus curbs the fuel pressure reduction that is caused by vapor moving from the fuel gallery into the pressurizing chamber during fuel pressurization.

In the above-described high-pressure fuel supplying apparatus, the vapor discharging passage may be connected to an upper end portion of the fuel gallery. This construction further ensures discharge of vapor.

Furthermore, the vapor discharging passage may also be formed by a low-pressure fuel passage that introduces fuel pumped from the feed pump into the fuel gallery. This construction makes it possible to form a vapor discharge space by utilizing an existing or conventional construction or structure, such as a low-pressure fuel passage or the like.

The vapor discharging passage may also be formed by a passage that connects the fuel gallery to an auxiliary fuel injection valve that injects fuel into an intake passage of the internal combustion engine. This construction makes it possible to form a vapor discharge space by utilizing an existing construction or structure of an internal combustion engine that has an auxiliary fuel injection valve.

The high-pressure fuel supplying apparatus may further include a controller that determines whether fuel vaporization has occurred in the fuel gallery, and when it has been determined that fuel vaporization has occurred, opens the auxiliary fuel injection valve so as to discharge vapor from the vapor discharging passage into the intake passage. Since vapor in the vapor discharge passage is discharged into the intake passage, this construction substantially prevents vapor from returning from the vapor discharge passage to the fuel gallery. The controller may determine that fuel vaporization has occurred when the engine is being started. The controller may also determine that fuel vaporization has occurred when the engine is being started, provided a temperature of the engine is higher than a predetermined temperature.

In the high-pressure fuel supplying apparatus, the vapor discharging passage may include a reservoir that is formed by expanding a portion of the vapor discharging passage vertically upward. In this construction, vapor discharged from the fuel gallery into the vapor discharging passage resides in an upper portion of the reservoir. Therefore, this construction substantially prevents fuel that has been discharged from the fuel gallery into the vapor discharging passage from flowing back into the fuel gallery.

Furthermore, in the high-pressure fuel supplying apparatus, the high-pressure pump may be connected to and driven by a camshaft of the internal combustion engine. In this construction, the high-pressure pump is disposed near a combustion chamber of the engine. Therefore, even in a high-pressure fuel supplying apparatus that is likely to receive heat from the engine so that vapor readily occurs, good restarting performance of the engine at high engine temperatures can be secured.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
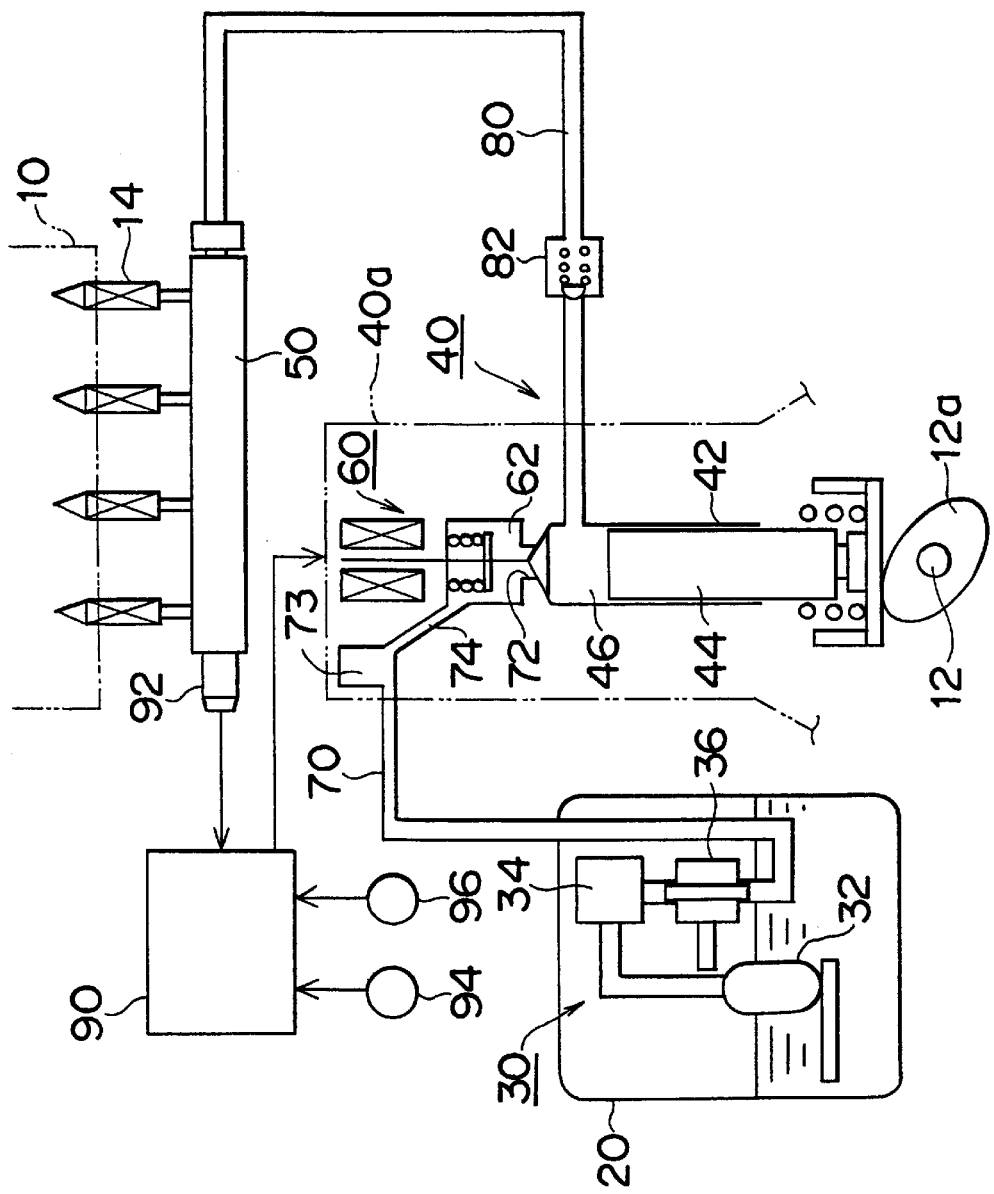
FIG. 1 is a schematic illustration of a construction of a high-pressure fuel supplying apparatus according to a first embodiment of the invention.
Figure 2:
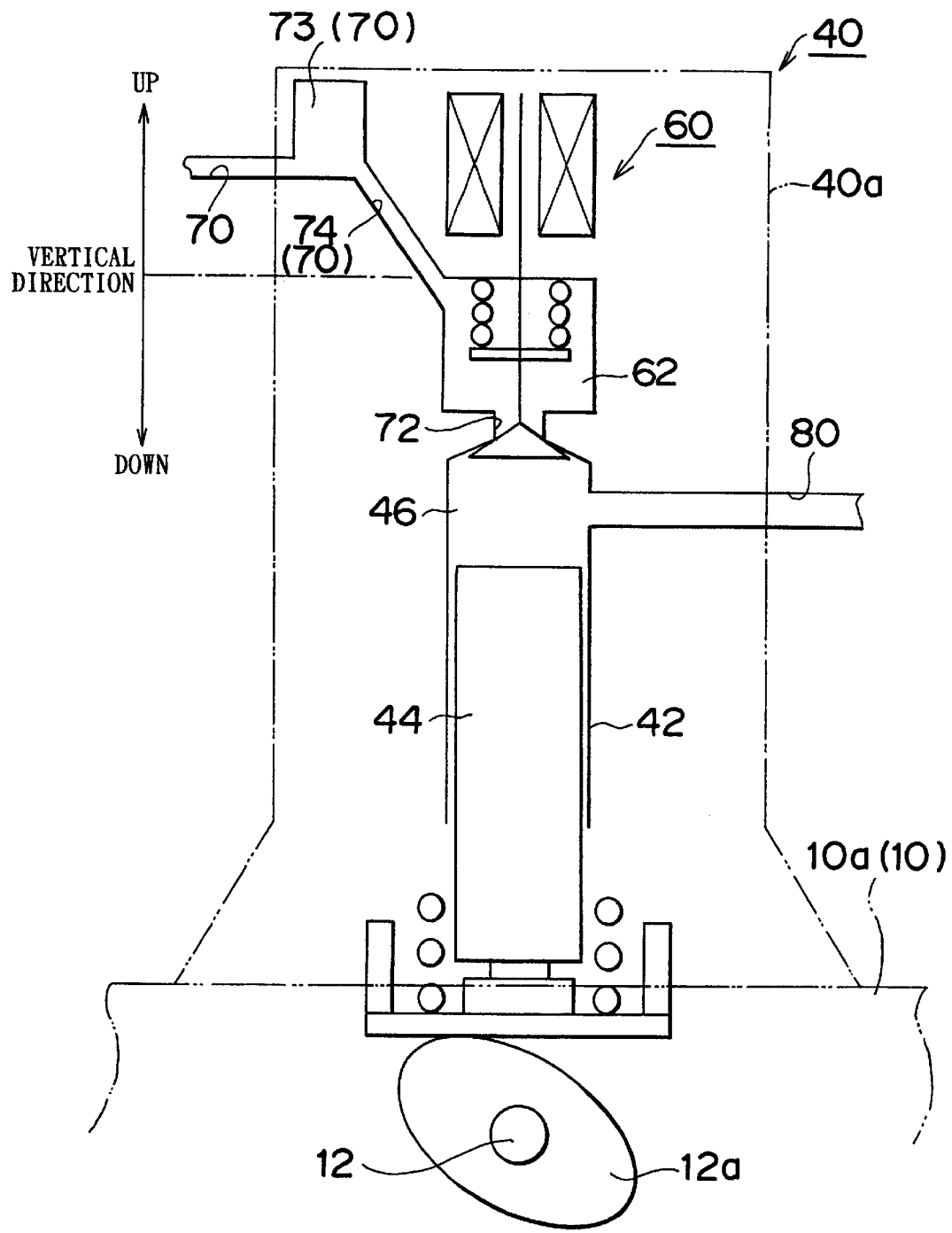
FIG. 2 is a schematic diagram illustrating a high-pressure pump of the high-pressure fuel supplying apparatus shown in FIG. 1.

A first embodiment in which the invention is applied to a high-pressure fuel supplying apparatus for an in-cylinder fuel injection gasoline engine installed in a vehicle will be described. FIG. 1 is a schematic diagram illustrating a construction of a high-pressure fuel supplying apparatus according to the first embodiment. FIG. 2 is a schematic diagram illustrating a high-pressure pump 40 and the like of the high-pressure fuel supplying apparatus shown in FIG. 1.

As shown in FIGS. 1 and 2, the high-pressure fuel supplying apparatus includes a fuel tank 20, a pump unit 30 provided in the fuel tank 20, the high-pressure pump 40 driven by a camshaft 12 of an engine 10, a delivery pipe 50 to which injectors 14 for in-cylinder fuel injection are connected, an electromagnetic valve 60 for adjusting the amount of fuel supplied from the high-pressure pump 40 to the delivery pipe 50, and the like.

The pump unit 30 is substantially made up of a feed pump 32, a filter 34, and a pressure regulator 36. Fuel ejected from the feed pump 32 passes through the filter 34, and then flows into the pressure regulator 36. The pressure regulator 36 is connected to the high-pressure pump 40 by a low-pressure fuel passage 70. Fuel is pumped to the high-pressure pump 40 through the low-pressure fuel passage 70, with the fuel pressure being adjusted to a substantially constant pressure by the pressure regulator 36.

As shown in FIG. 2, the high-pressure pump 40 is mounted to a cylinder head 10a of the engine 10. The high-pressure pump 40 has a cylinder 42 that is formed in a housing 40a, a plunger 44 movable back and forth in the cylinder 42, and a pressurizing chamber 46 defined by an inner peripheral surface of the cylinder 42 and a top surface of the plunger 44. The plunger 44 is driven reciprocally by rotation of a cam 12a formed on the camshaft 12, so as to pressurize fuel introduced into the pressurizing chamber 46 to a high pressure.

The pressurizing chamber 46 is connected to the delivery pipe 50 by a high-pressure fuel passage 80. After being pumped from the pressurizing chamber 46 to the delivery pipe 50, fuel is distributed to the individual injectors 14 by the delivery pipe 50. The high-pressure fuel passage 80 is provided with a check valve 82 for restricting fuel from flowing from the delivery pipe 50 back into the pressurizing chamber 46.

The electromagnetic valve 60 is disposed within the housing 40a of the high-pressure pump 40. A fuel gallery 62 of the electromagnetic valve 60 is formed above the pressurizing chamber 46 in a vertical direction. The fuel gallery 62 is supplied with fuel from the feed pump 32, via the low-pressure fuel passage 70. The fuel gallery 62 is connected to the pressurizing chamber 46 by a fuel introducing passage 72 that is opened and closed by the electromagnetic valve 60. Fuel is introduced from the fuel gallery 62 into the pressurizing chamber 46 through the fuel introducing passage 72.

A portion of the low-pressure fuel passage 70 that is located near the fuel gallery 62 is formed by a reservoir chamber 73 formed in the housing 40a, and a communication passage 74 formed in the housing 40a so as to interconnect the reservoir chamber 73 and the fuel gallery 62.

The reservoir chamber 73 is formed by expanding (enlarging) the sectional area of a portion of the low-pressure fuel passage 70 vertically upward. The reservoir chamber 73 is located above an upper end of the fuel gallery 62 in a vertical direction (the upper end of the fuel gallery 62 is indicated by the one-dot broken line in FIG. 2). Therefore, the reservoir chamber 73 is farther apart from the engine 10 (cylinder head 10a) than the fuel gallery 62 is apart from the engine 10, as can be seen in FIG. 2. FIG. 1 does not show an actual positional relationship among the engine 10, the fuel gallery 62 and the reservoir chamber 73.

One end of the communication passage 74 is connected to an upper end portion of the fuel gallery 62. The other end portion of the communication passage 74 extends diagonally upward from the upper end portion of the fuel gallery 62 and connects to the reservoir chamber 73. Thus, the communication passage 74 is located above the upper end of the fuel gallery 62 in the vertical direction, as is the case with the reservoir chamber 73.

As shown in FIG. 1, the high-pressure fuel supplying apparatus of this embodiment includes a controller 90 that controls the amount of fuel supplied from the high-pressure pump 40 to the delivery pipe 50 by opening and closing the electromagnetic valve 60. Based on detection signals from various sensors, including a fuel pressure sensor 92 for detecting the fuel pressure in the delivery pipe 50, a water temperature sensor 94 for detecting the temperature of cooling water of the engine 10 (cooling water temperature THW), a rotating speed sensor 96 and the like, the controller 90 executes the aforementioned fuel supply amount control, and also executes various other controls, such as fuel injection control, ignition timing control and the like.

A fuel supplying operation of the high-pressure fuel supplying apparatus will be described.

During the suction stroke, during which the plunger 44 descends in accordance with rotation of the camshaft 12, the controller 90 controls the electromagnetic valve 60 so that the electromagnetic valve 60 opens. Therefore, the fuel gallery 62 and the pressurizing chamber 46 become connected to each other by the fuel introducing passage 72, so that fuel supplied from the feed pump 32 into the fuel gallery 62 is introduced into the pressurizing chamber 46 via the fuel introducing passage 72. Since fuel introduced into the pressurizing chamber 46 in this manner is at a low pressure, the check valve 82 will not open, so that fuel will not flow from the pressurizing chamber 46 to the high-pressure fuel passage 80.

During the ejection stroke, during which the plunger 44 ascends in accordance with rotation of the camshaft 12, the controller 90 controls the electromagnetic valve 60 so that the electromagnetic valve 60 closes. The communication between the fuel gallery 62 and the pressurizing chamber 46 is therefore discontinued. As the plunger 44 ascends, fuel is pressurized in the pressurizing chamber 46. Due to an increased fuel pressure, the check valve 82 assumes an open state, so that fuel is supplied from the pressurizing chamber 46 to the delivery pipe 50 via the high-pressure fuel passage 80.

If the electromagnetic valve 60 is opened during an intermediate period of the ejection stroke so as to connect the fuel gallery 62 and the pressurizing chamber 46 to each other, an amount of fuel equal to a capacity reduction of the pressurizing chamber 46 in accordance with ascent of the plunger 44 is discharged from the pressure regulator 36 into the fuel tank 20. Thus, although the plunger 44 continues ascending, fuel pressurization in the pressurizing chamber 46 discontinues and fuel supply to the delivery pipe 50 stops. Therefore, the amount of fuel supplied to the high-pressure pump 40 can be adjusted by changing the open valve duration of the electromagnetic valve 60 during the ejection stroke. When the engine is in a stopped state, the electrification of the electromagnetic valve 60 by the controller 90 is stopped, so that the electromagnetic valve 60 remains in the closed state and the fuel introducing passage 72 is thereby closed.

If, in the above-described high-pressure fuel supplying apparatus, the engine 10 is stopped after a high-load operation so that heat from the engine 10 raises the fuel temperature in the fuel gallery 62 close to the boiling point, fuel vapor is produced in the fuel gallery 62 as described above. Furthermore, if the engine 10 is restarted when the fuel temperature is at such an increased level, the fuel vaporization is accelerated by cavitation that is caused by reciprocations of the plunger 44.

In the high-pressure fuel supplying apparatus of this embodiment, however, fuel vapor produced in the fuel gallery 62 hardly resides therein. Rather, most fuel vapor is caused to flow out of the fuel gallery 62 toward the low-pressure fuel passage 70. In the construction of the embodiment, the communication passage 74, which serves to connect the low-pressure fuel passage 70 to the fuel gallery 62, extends diagonally upward from an upper end portion of the fuel gallery 62, so that the communication passage 74 is located above the upper end of the fuel gallery 62. Since fuel vapor has a smaller specific gravity than fuel liquid, fuel vapor moves into an upper portion of the fuel gallery 62 and fuel vapor is let out of the fuel gallery 62 via the communication passage 74.

Therefore, the embodiment is able to restrain the fuel pressure reduction that is caused by fuel vapor moving from the fuel gallery 62 into the pressurizing chamber 46 during fuel pressurization. Consequently, the embodiment is able to secure good restarting performance even when the engine has a high temperature.

Furthermore, the communication passage 74 for discharging fuel vapor from the fuel gallery 62 is connected specifically to an upper end portion of the fuel gallery 62 in this embodiment. This construction facilitates movement of fuel vapor from the fuel gallery 62 into the communication passage 74.

This construction according to this embodiment further ensures discharge of fuel vapor from the fuel gallery 62 to the pressurizing chamber 46. In this respect, further improved restarting performance can be secured.

Further, in the embodiment, the communication passage 74 is connected to the reservoir chamber 73, which is formed by expanding the sectional area of a portion of the low-pressure fuel passage 70 vertically upward. Therefore, after flowing into the reservoir chamber 73 from the communication passage 74, fuel vapor moves into an upper portion of the reservoir chamber 73.

Therefore, the embodiment is able to substantially prevent an undesired event from occurring in which fuel vapor discharged from the fuel gallery 62 toward the low-pressure fuel passage 70 returns to the fuel gallery 62 together with liquid fuel flowing through the low-pressure fuel passage 70.

Still further, in this embodiment, the reservoir chamber 73 for holding fuel vapor is located farther apart from the engine 10 than the fuel gallery 62 is apart from the engine 10. Therefore, portions around the reservoir chamber 73 are likely to receive less heat conducted from engine 10 and therefore have lower temperatures than the fuel gallery 62. Hence, fuel vapor in the reservoir chamber 73 is cooled and turned back into liquid fuel.

Movement of fuel vapor from the fuel gallery 62 to the reservoir chamber 73 will be considered in terms of heat exchange. This fuel vapor movement transfers heat from the fuel gallery 62 to the reservoir chamber 73. More specifically, fuel vapor absorbs heat from its surroundings during vaporization in the fuel gallery 62, and releases heat to its surroundings when it condenses in the reservoir chamber 73.

In this manner of heat transfer, the embodiment reduces the fuel temperature in the fuel gallery 62. Therefore, the amount of fuel vapor that occurs in the fuel gallery 62 is reduced, so that the restarting performance can be further improved.

Still further, in this embodiment, the space for discharging fuel vapor from the fuel gallery 62 is formed by the reservoir chamber 73 and the communication passage 74, which form portions of the low-pressure fuel passage 70.

Therefore, in this embodiment, the space for discharging fuel vapor from the fuel gallery 62 can be formed by utilizing existing constructions or structures. This embodiment thus avoids complication of construction that would otherwise be caused in order to secure good restarting performance.

A second embodiment of the invention will now be described, mainly with reference to differences from the first embodiment. Constructions comparable to those in the first embodiment will not be described again.

Figure 3:
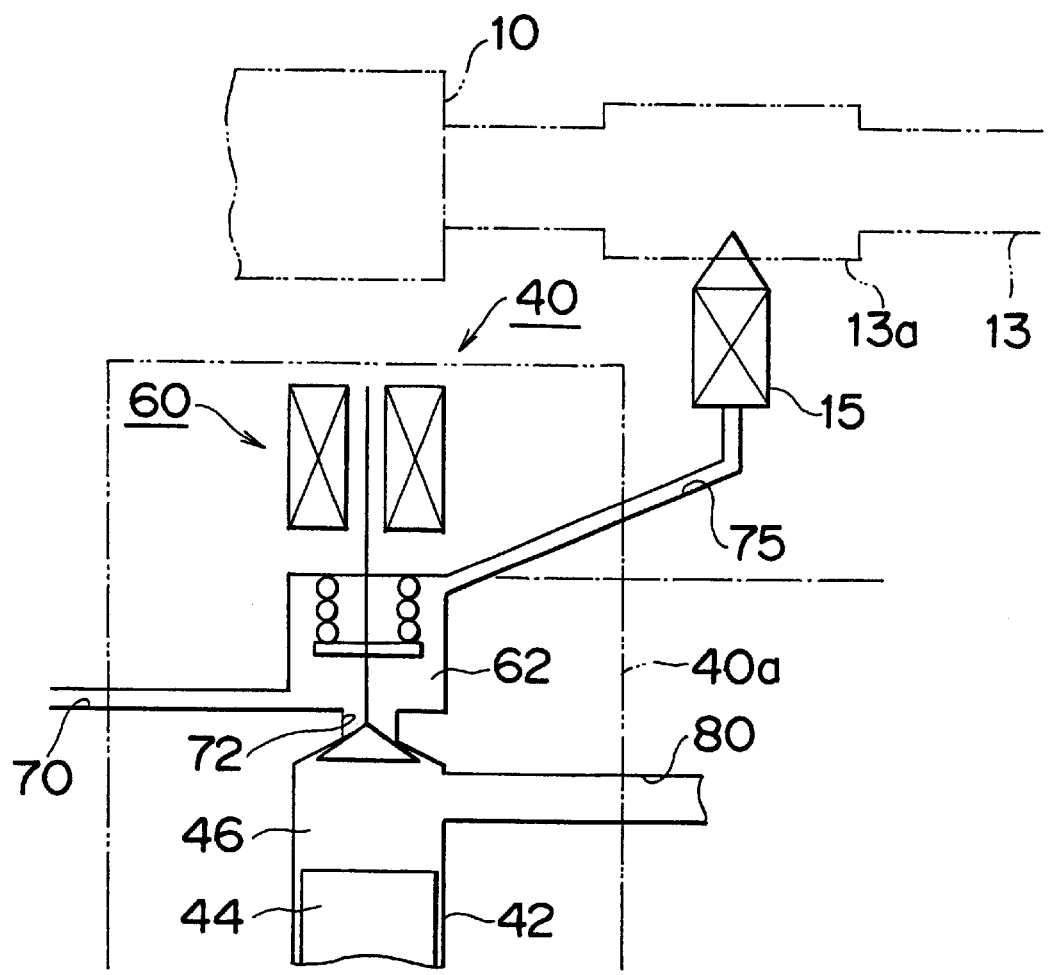
FIG. 3 is a schematic diagram illustrating a high-pressure pump of a high-pressure fuel supplying apparatus according to a second embodiment.

In the second embodiment, the high-pressure fuel supplying apparatus of the invention is applied to an engine 10 that has a sub-injector 15 for injecting fuel into an intake passage 13 as shown in FIG. 3. Both a reservoir chamber 73 and a communication passage 74 are omitted, and a low-pressure fuel passage 70 is connected to a side portion of a fuel gallery 62.

The sub-injector 15 is provided for temporarily injecting fuel into a surge tank 13a (that forms a portion of the intake passage 13) during a cold start or the like, in addition to in-cylinder fuel injection from injectors 14 (see FIG. 1). The sub-injector 15 is disposed above an upper end (the upper end is indicated by a one-dot broken line in FIG. 3) of the fuel gallery 62. The sub-injector 15 is mounted to the surge tank 13a in such a manner that a jetting opening (not shown) formed in a distal end portion of the sub-injector 15 faces vertically upward.

The sub-injector 15 and the fuel gallery 62 are connected by a fuel supplying passage 75. One end of the fuel supplying passage 75 is connected to an upper end portion of the fuel gallery 62. The other end of the fuel supplying passage 75 extends diagonally upward and connects to the sub-injector 15. Fuel is pumped from a feed pump 32 into the fuel gallery 62, and supplied therefrom to the sub-injector 15 through the fuel supplying passage 75.

In addition to supplying fuel to the sub-injector 15, the fuel supplying passage 75 performs substantially the same function in discharging fuel vapor from the fuel gallery 62 as the above-described communication passage 74 in the first embodiment. That is, when fuel vapor is produced in the fuel gallery 62, that fuel vapor is discharged therefrom into the fuel supplying passage 75. After being discharged into the fuel supplying passage 75, fuel vapor moves upward in the fuel supplying passage 75 and reaches the vicinity of the sub-injector 15.

In the high-pressure fuel supplying apparatus of this embodiment, fuel vapor produced in the fuel gallery 62 is discharged into the surge tank 13a by opening the sub-injector 15 during a high-temperature start. A control of the sub-injector 15 will be described below with reference to the flowchart of FIG. 4. The controller 90 executes a series of operations illustrated in FIG. 4 in a predetermined cycle.

Figure 4:
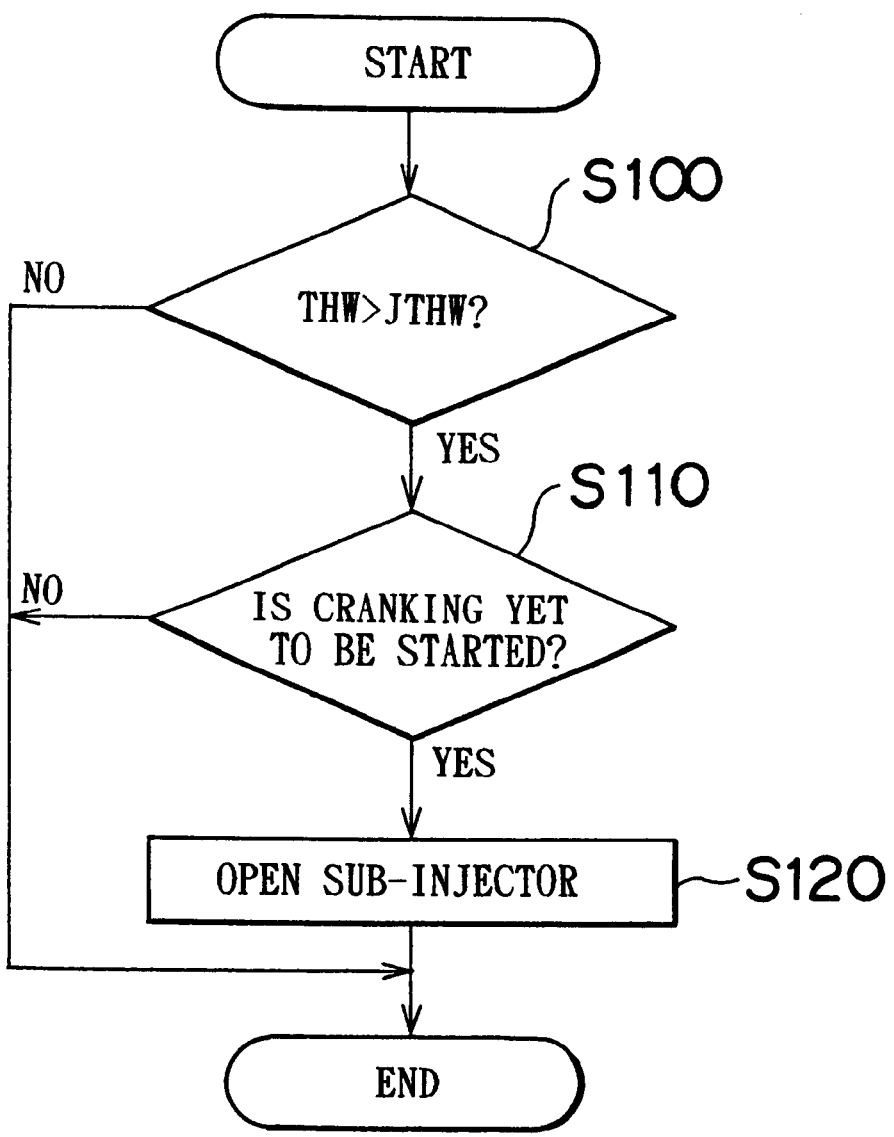
FIG. 4 is a flowchart illustrating a procedure of controlling a sub-injector for discharging vapor into an intake passage.

In step S100 in FIG. 4, the controller 90 determines whether the cooling water temperature THW is higher than a reference temperature JTHW. When it is determined that the cooling water temperature THW is equal to or lower than the reference temperature JTHW, it is considered that the engine temperature is low so that no fuel vapor has occurred in the fuel gallery 62. Therefore, the process temporarily ends.

Conversely, when it is determined that the cooling water temperature THW is higher than the reference temperature JTHW, so that fuel vapor has been produced in the fuel gallery 62, the controller 90 determines in step S110 whether a starting operation of the engine 10 is yet to be started, that is, whether cranking is yet to be started. If it is determined that cranking is yet to be started, the process proceeds to step S120. Before cranking is started, that is, when the crankshaft is not rotating, the electromagnetic valve 60 is not electrified, so that the electromagnetic valve 60 remains in a closed state.

In step S120, the controller 90 forcibly maintains an open valve state of the sub-injector 15 for a predetermined length of time. As a result, an amount of fuel vapor that has moved to the vicinity of the sub-injector 15 from the fuel gallery 62 via the fuel supplying passage 75 is discharged into the surge tank 13a. When the controller 90 determines in step S110 that cranking has already been started or completed, the controller 90 temporarily ends the process.

In short, the high-pressure fuel supplying apparatus of this embodiment discharges fuel vapor from the fuel gallery 62 into the fuel supplying passage 75, which is an existing or conventional construction for supplying fuel into the sub-injector 15, so that during a high-temperature start, fuel vapor is discharged from the fuel supplying passage 75 into the surge tank 13a via the sub-injector 15.

Therefore, the embodiment curbs the fuel pressure reduction caused by fuel vapor moving from the fuel gallery 62 into the pressurizing chamber 46 during fuel pressurization. Hence, the embodiment is able to secure good restarting performance even when the temperature of the engine is high.

Furthermore, the fuel supplying passage 75 for discharging fuel vapor from the fuel gallery 62 is connected specifically to an upper end portion of the fuel gallery 62 in this embodiment. This construction facilitates movement of fuel vapor from the fuel gallery 62 into the fuel supplying passage 75.

This construction according to the embodiment further ensures discharge of fuel vapor from the fuel gallery 62, away from the pressurizing chamber 46, rather than into the pressurizing chamber 46. In this respect, further improved restarting performance can be secured.

Movement of fuel vapor from the fuel gallery 62 to the sub-injector 15 will be considered in terms of heat exchange. This fuel vapor movement transfers heat from the fuel gallery 62 to the sub-injector 15. More specifically, fuel vapor absorbs heat from its surroundings when vaporizing in the fuel gallery 62, and releases heat into its surroundings when condensing in the passage 75, sub-injector 15 and/or surge tank 13a.

In this manner of heat transfer, the embodiment reduces the fuel temperature in the fuel gallery 62. Therefore, the amount of fuel vapor that occurs in the fuel gallery 62 is reduced, so that the restarting performance can be further improved.

Still further, in this embodiment, the space for discharging fuel vapor from the fuel gallery 62 is formed by the sub-injector 15 and the fuel supplying passage 75. Therefore, in this embodiment, the space for discharging fuel vapor from the fuel gallery 62 can be formed by utilizing existing constructions or structures. The embodiment thus avoids complication of construction that would otherwise be caused in order to secure good restarting performance.

Further, since fuel vapor is discharged from the sub-injector 15 into the surge tank 13*a*, the return of fuel vapor from the fuel supplying passage 75 to the fuel gallery 62 is substantially prevented, so that fuel vapor in the fuel gallery 62 can be reliably reduced. Therefore, further improved restarting performance can be achieved.

Still further, in this embodiment, the operation of discharging fuel vapor by forcibly opening the sub-injector 15 is performed provided that cranking at the time of an engine start has not started and that the cooling water temperature THW is higher than a predetermined temperature (the reference temperature JTHW). Therefore, this embodiment is able to precisely determine whether fuel vapor has been produced in the fuel gallery 62 due to a fuel temperature increase caused by heat from the engine while the engine is in a stopped state. Based on such precise determination, this embodiment performs the fuel vapor discharging operation.

Further, since the fuel supplying passage 75 is connected to the fuel gallery 62 in this embodiment, the effective capacity of the fuel gallery 62 can be increased. Therefore, the embodiment reduces the pulsation of fuel pressure that occurs in the fuel gallery 62. Hence, operation failures of the electromagnetic valve 60 caused by such pressure pulsation can be avoided.

The foregoing embodiments may also be modified as described below.

Figure 5:
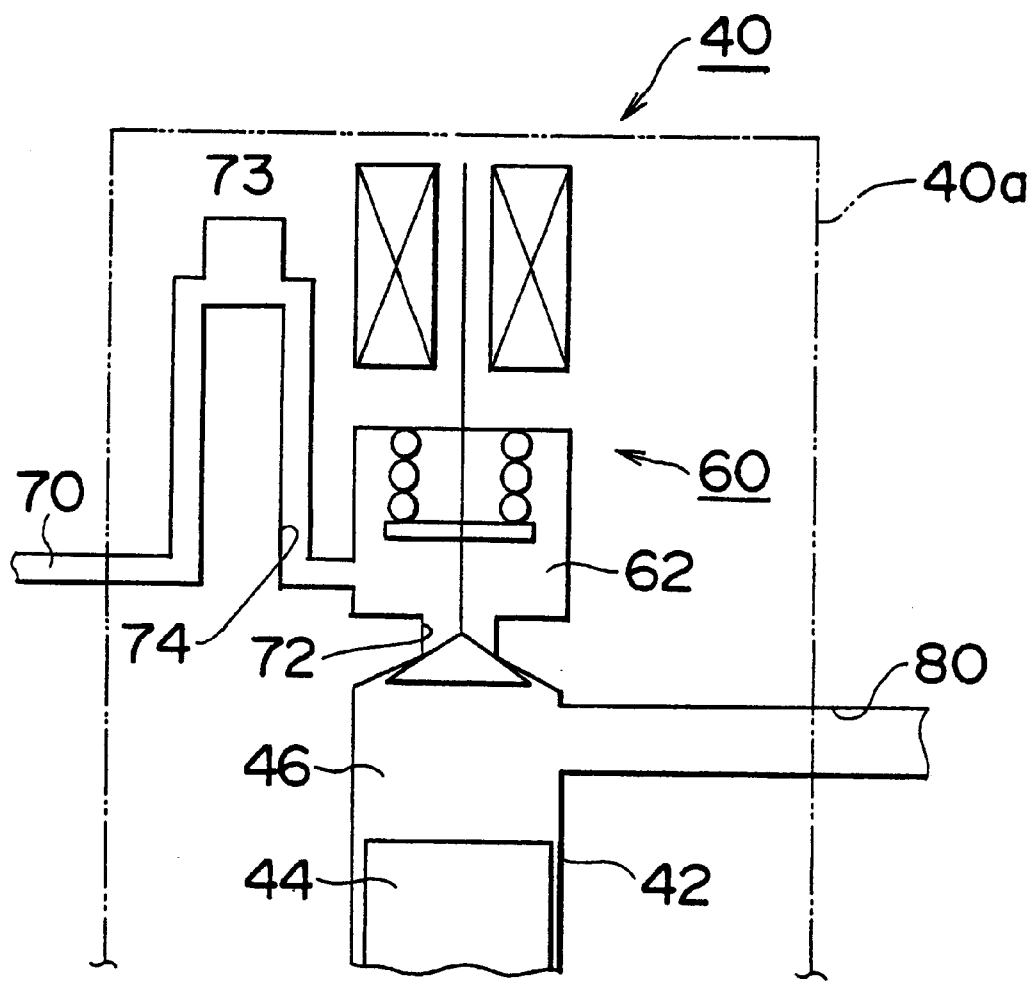
FIG. 5 is a schematic illustration of a modification to a low-pressure fuel passage.
Figure 6:
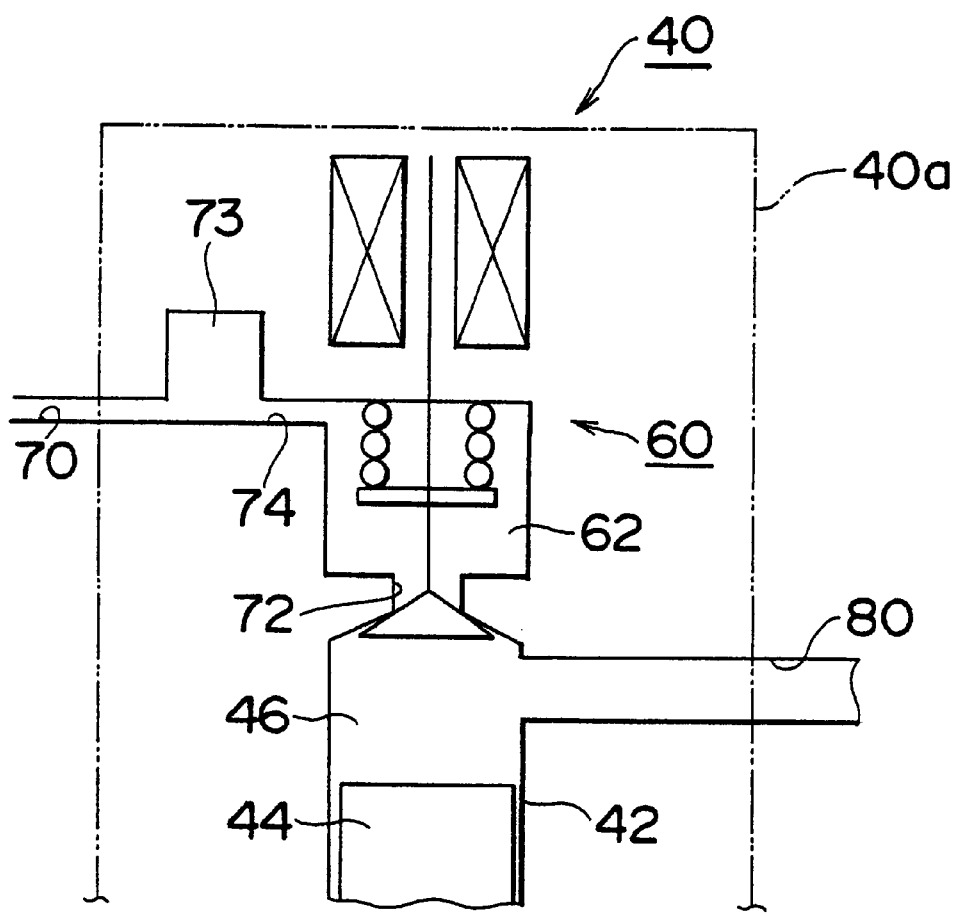
FIG. 6 is a schematic illustration of another modification to the low-pressure fuel passage.

Although in the first embodiment, the entire communication passage 74 for discharging fuel vapor from the fuel gallery 62 is disposed above the upper end of the fuel gallery 62, it is also possible to dispose only a portion of the communication passage 74 above the upper end of the fuel gallery 62 and to provide the reservoir chamber 73 in that portion of the communication passage 74 as shown in FIG. 5. Thus, passage 74 need not connect to the top-most (vertically highest) portion of the fuel gallery 62. It is also possible to adopt a construction as shown in FIG. 6, in which the communication passage 74 is disposed at substantially the same vertical level as the upper end of the fuel gallery 62. This construction may slightly degrade the fuel vapor discharging function, but is still useful in, for example, a case where the amount of fuel vapor that occurs in the fuel gallery 62 during a stopped engine state is not considerably large.

Figure 7:
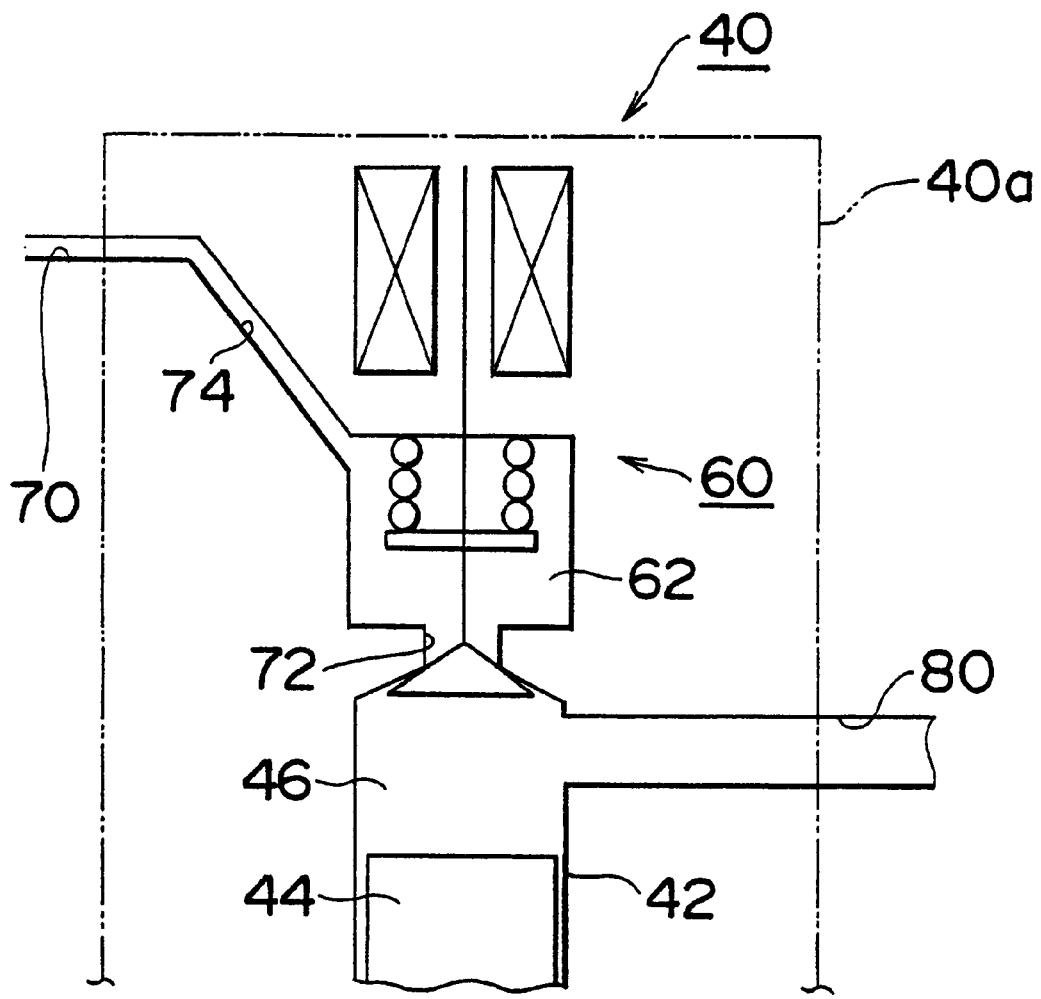
FIG. 7 is a schematic illustration of still another modification to the low-pressure fuel passage.

Although in the first embodiment, the reservoir chamber 73 is provided for holding fuel vapor discharged into the communication passage 74, it is also possible to adopt a construction as shown in FIG. 7, in which the reservoir chamber 73 is eliminated. It is also possible to eliminate the reservoir chamber 73 in the constructions shown in FIGS. 5 and 6.

Figure 8:
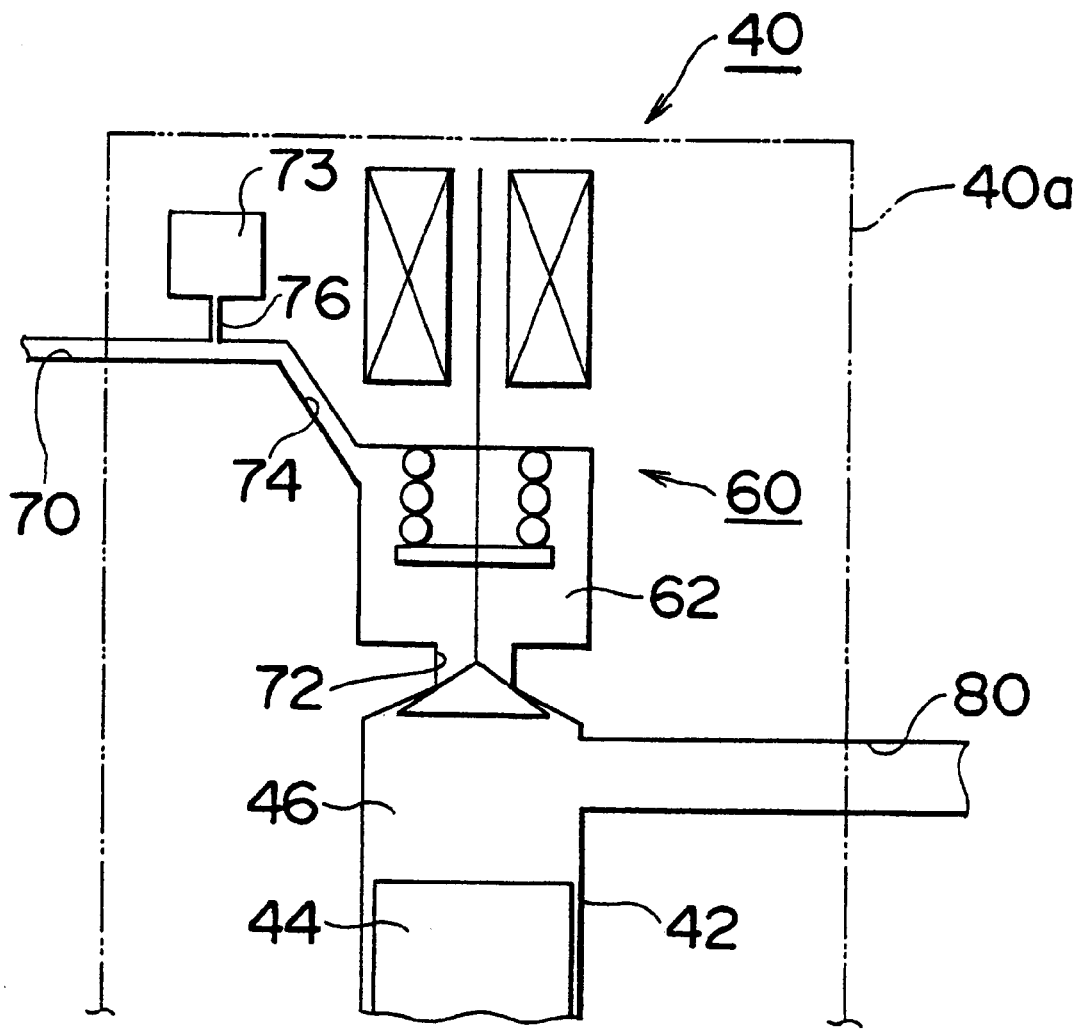
FIG. 8 is a schematic illustration of a further modification to the low-pressure fuel passage.

It is also possible to adopt a construction as shown in FIG. 8, in which the reservoir chamber 73 and the low-pressure fuel passage 70 (communication passage 74) are connected via a constriction 76. The construction having the constriction 76 makes it possible to reliably hold fuel vapor in the reservoir chamber 73. Therefore, it becomes possible to more reliably prevent fuel vapor from returning from the low-pressure fuel passage 70 to the fuel gallery 62.

Although in the second embodiment, the operation of discharging fuel vapor from the fuel supplying passage 75 by opening the sub-injector 15 is performed provided that cranking is yet to be started and that the cooling water temperature THW is higher than the reference temperature JTHW, it is also possible to always perform the fuel vapor discharging operation as a routine before cranking is started, regardless of the cooling water temperature THW.

Although in the second embodiment, the controller 90 determines whether fuel vapor has been produced in the fuel gallery 62 on the basis of the cooling water temperature THW detected by the water temperature sensor 94, it is also possible to provide a temperature sensor for detecting the fuel temperature in, for example, the delivery pipe 50, and to use the fuel temperature detected by that sensor as a basis for the aforementioned determination. It is also possible to use the temperature of a lubricant of the engine 10 as a basis for the determination.

Although the second embodiment discharges fuel vapor from the fuel supplying passage 75 into the surge tank 13*a* by opening the sub-injector 15 at the time of a start of the engine before cranking is started, it is also possible to discharge fuel vapor from the fuel supplying passage 75 into the surge tank 13*a* by, for example, maintaining the open valve state of the sub-injector 15 for a predetermined length of time (for example, until the cooling water temperature THW drops to or below a predetermined temperature) following stop of both the operation of the engine 10 and the fuel pumping operation of the feed pump 32.

Figure 9:
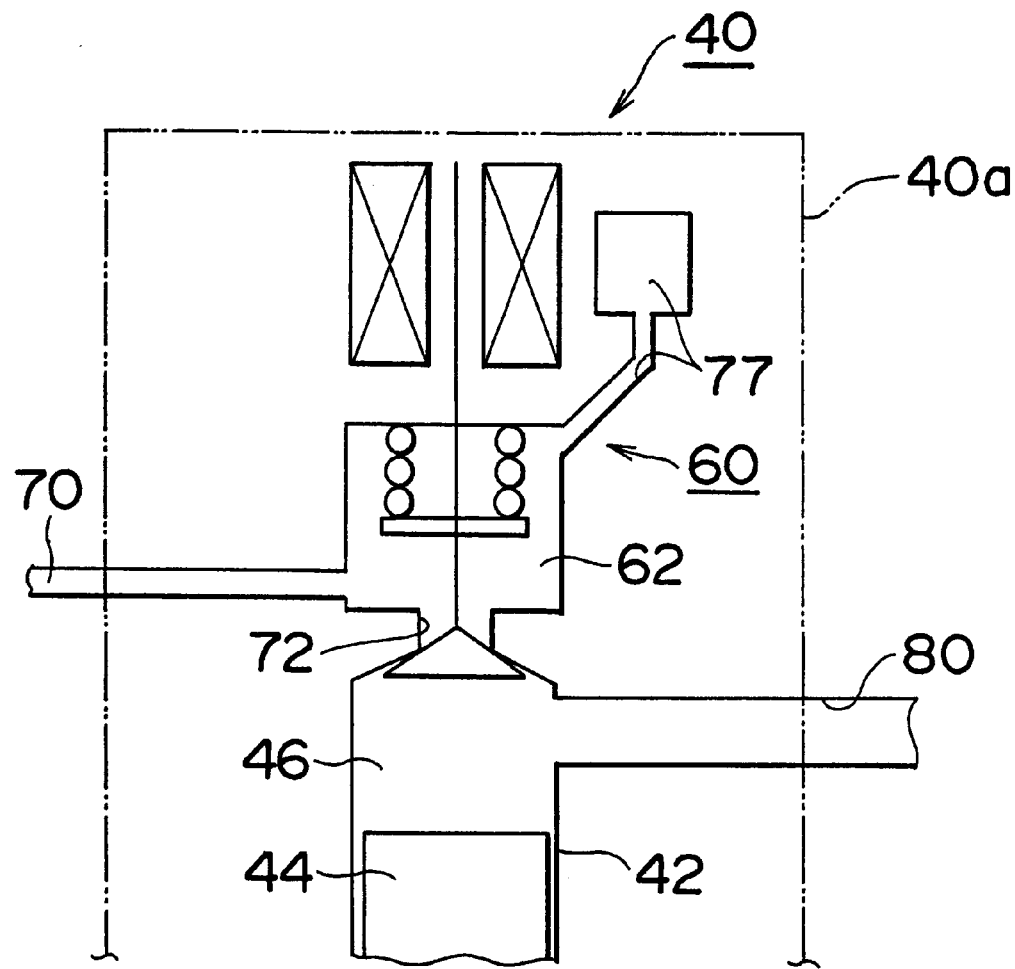
FIG. 9 is a schematic illustration of a construction in which a space for discharging vapor is separately formed.

Although in the foregoing embodiments, the space for discharging fuel vapor from the fuel gallery 62 is formed by utilizing existing or conventional constructions or structures, such as the low-pressure fuel passage 70, the fuel supplying passage 75 and the like, it is also possible to separately form a fuel vapor discharge space 77 as shown in FIG. 9.

If the engine 10 employs a canister for capturing fuel vapor produced in the fuel tank 20, it is possible to adopt a construction wherein the canister and the fuel gallery 62 are connected by a passage and wherein a portion of the passage that is connected to the fuel gallery 62 is designed to perform a vapor discharging function substantially the same as those of the communication passage 74 and the fuel supplying passage 75.

The controller (controller 90) can be implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the processes described herein and/or shown in FIG. 4 can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A high-pressure fuel supplying apparatus for an internal combustion engine, comprising:
- a high-pressure pump having a fuel gallery and a pressurizing chamber, the high-pressure pump introducing fuel from the fuel gallery into the pressurizing chamber, pressurizing fuel to a high pressure in the pressurizing chamber, and supplying pressurized fuel to an in-cylinder fuel injection valve;
- a feed pump that pumps fuel from a fuel tank to the fuel gallery; and
- a vapor discharging passage that discharges vapor from the fuel gallery, at least a portion of the vapor discharging passage located above or at substantially a same vertical level as an upper end of the fuel gallery in a vertical direction, the vapor discharging passage including a reservoir portion, which is a portion of the vapor discharging passage having a sectional area that is expanded vertically upward.

2. A high-pressure fuel supplying apparatus according to claim 1, wherein the vapor discharging passage is connected to the upper end of the fuel gallery.

3. A high-pressure fuel supplying apparatus according to claim 1, wherein the vapor discharging passage is part of a low-pressure fuel passage that introduces fuel pumped from the feed pump into the fuel gallery.

4. A high-pressure fuel supplying apparatus according to claim 1, wherein the vapor discharging passage includes a low-pressure fuel passage that introduces fuel pumped from the feed pump into the fuel gallery, and further comprising a constriction that interconnects the reservoir portion and the low-pressure fuel passage.

5. A high-pressure fuel supplying apparatus according to claim 1, wherein the high-pressure pump is driven by and connected to a camshaft of the internal combustion engine.

6. A high-pressure fuel supplying apparatus according to claim 1, wherein the reservoir portion defines a closed space that does not communicate with atmosphere.

7. A high-pressure fuel supplying apparatus for an internal combustion engine, comprising:
- a high-pressure pump having a fuel gallery and a pressurizing chamber, the high-pressure pump introducing fuel from the fuel gallery into the pressurizing chamber, pressurizing fuel to a high pressure in the pressurizing chamber, and supplying pressurized fuel to an in-cylinder fuel injection valve;
- a feed pump that pumps fuel from a fuel tank to the fuel gallery; and
- a vapor discharging passage that discharges vapor from the fuel gallery, at least a portion of the vapor discharging passage located above or at substantially a same vertical level as an upper end of the fuel gallery in a vertical direction, the vapor discharging passage is part of a low-pressure fuel passage, located between the feed pump and the fuel gallery, that introduces fuel pumped from the feed pump into the fuel gallery.

8. A high-pressure fuel supplying apparatus according to claim 7, wherein the vapor discharging passage is connected to the upper end of the fuel gallery.

9. A high-pressure fuel supplying apparatus according to claim 7, wherein the vapor discharging passage includes a reservoir portion, which is a portion of the vapor discharging passage having a sectional area that is expanded vertically upward.

10. A high-pressure fuel supplying apparatus according to claim 9, wherein the reservoir portion defines a closed space that does not communicate with atmosphere.

11. A high-pressure fuel supplying apparatus according to claim 7, wherein the high-pressure pump is driven by and connected to a camshaft of the internal combustion engine.

12. A high-pressure fuel supplying apparatus for an internal combustion engine, comprising:
- a high-pressure pump having a fuel gallery and a pressurizing chamber, the high-pressure pump introducing fuel from the fuel gallery into the pressurizing chamber, pressurizing fuel to a high pressure in the pressurizing chamber, and supplying pressurized fuel to an in-cylinder fuel injection valve;
- a feed pump that pumps fuel from a fuel tank to the fuel gallery; and
- a vapor discharging passage that discharges vapor from the fuel gallery, at least a portion of the vapor discharging passage located above or at substantially a same vertical level as an upper end of the fuel gallery in a vertical direction, the vapor discharging passage includes a reservoir portion, the reservoir portion defines a closed space that does not communicate with atmosphere.

13. A high-pressure fuel supplying apparatus according to claim 12, wherein the vapor discharging passage is connected to the upper end of the fuel gallery.

14. A high-pressure fuel supplying apparatus according to claim 12, wherein the high-pressure pump is driven by and connected to a camshaft of the internal combustion engine.

* * * * *